United States Patent [19]

Powell

[11] 3,821,179

[45] June 28, 1974

[54] IONIC ETHYLENE COPOLYMERS CONTAINING SLIP/BLOCK ADDITIVES

[75] Inventor: Richard James Powell, Orange, Tex.

[73] Assignee: E. I. du Pont de Nemours and Company, Wilmington, Del.

[22] Filed: Sept. 6, 1972

[21] Appl. No.: 286,550

[52] U.S. Cl. 260/88.1 R, 260/78.5 T, 260/94.9 GD
[51] Int. Cl. ........................ C08f 15/04, C08f 15/14
[58] Field of Search ........ 260/DIG. 31, 88.1 R, 78.5

[56] References Cited
UNITED STATES PATENTS

| | | | |
|---|---|---|---|
| 3,264,272 | 8/1966 | Rees | 260/DIG. 31 |
| 3,322,734 | 5/1967 | Rees | 260/DIG. 31 |
| 3,373,223 | 3/1968 | Armstrong | 260/88.1 R |
| 3,373,224 | 3/1968 | Mesrobian et al. | 260/DIG. 31 |
| 3,376,275 | 4/1968 | Bayerlein | 260/88.1 R |
| 3,475,267 | 10/1969 | Miles | 260/88.1 R |
| 3,489,824 | 1/1970 | Anspon | 260/88.1 R |

*Primary Examiner*—Harry Wong, Jr.

[57] ABSTRACT

The addition of N,N'-di-erucyl adipamide or N,N'-di-erucyl sebacamide to ionic copolymers comprising an $\alpha$-olefin of the general formula $RCH=CH_2$ where R is a radical selected from hydrogen and alkyl radicals having from one to eight carbon atoms and an $\alpha,\beta$-ethylenically unsaturated carboxylic acid having three to eight carbon atoms, the olefin content of said copolymer being at least 50 mole percent based on the copolymer, the acid monomer content of said copolymer being from 0.2 to 25 mole percent based on the copolymer, said copolymer having from 10 percent to 90 percent of the carboxylic acid groups neutralized with metal ions, one or more metal ions having ionized valences of 1 to 3 inclusive, the resulting film having improved slip/block properties without chalking.

10 Claims, No Drawings

IONIC ETHYLENE COPOLYMERS CONTAINING SLIP/BLOCK ADDITIVES

BACKGROUND OF THE INVENTION

1. Field of the Invention

This invention relates to compositions which yield films. More particularly, this invention relates to ionomer compositions which contain additives for improving the slip and block properties of films prepared from said compositions.

2. Prior Art

In many applications, e.g., the unrolling of a roll of plastic film or the feeding of sheets of film from a stack of such sheets, it is desirable that there be little cohesion of the film to an adjacent layer thereof. One measure of this cohesion is called block, which is a measure of the force required to peel one sheet of plastic film from another. Another measure of this cohesion is called slip, which is a measure of the force required to draw one sheet of plastic film across another sheet thereof. Generally, a low value for slip and for block means that a low force is required in each of these tests and therefore that the cohesion is also low. In applications of unrolling a roll of film or feeding sheets of film from a stack, the lower the value of slip and block, the more desirable. The use of agents in film resin compositions for the purpose of improving the slip and block properties of the resultant film is known. Such agents include oleamide, erucamide, and stearamide as used in polyethylene. However, because of the polar nature of the ionomer structure, high loadings of slip/block additives are required. Heretofore, use of high levels of known slip additives in film has resulted in chalking and/or excessive odor. Thus, at lower additive levels known slip/block additives are deficient, either because slip/block properties are not sufficiently improved at lower additive levels or because odor and/or chalking are objectionable at higher levels.

Now it has been found that when N,N'-di-erucyl adipamide or N,N'-di-erucyl sebacamide is incorporated into a film-forming resin composition, the resultant film exhibits improved slip and block properties without chalking.

SUMMARY OF THE INVENTION

In accordance with the invention new compositions have been found which comprise:

a. an ionic copolymer of an α-olefin having the formula R—CH=CH$_2$, where R is a radical selected from the group consisting of hydrogen and alkyl radicals having from one to eight carbon atoms and α,β-ethylenically unsaturated carboxylic acids having three to eight carbon atoms, wherein the concentration of the α-olefin is at least 50 mole percent in the copolymer, based on the α-olefin acid copolymer, the copolymers having from 10 percent to 90 percent of the carboxylic acid groups ionized by neutralization with metal ions, the unsaturated carboxylic acid content of the copolymer is from 0.2 to 25 mole percent, based on the α-olefin-acid copolymer, any other monomer component optionally copolymerized in said copolymer is monoethylenically unsaturated and said metal ions having an ionized valence of from one to three, inclusive, when the unsaturated acid is a monocarboxylic acid and an ionized valence of one when the unsaturated acid is a dicarboxylic acid and said metal ions are selected from the group consisting of uncomplexed and complexed metal ions, and b. 0.05 to 2.0 weight percent of N,N'-di-erucyladipamide or N,N'-di-erucyl sebacamide.

The α-olefins employed in the formation of the base copolymers from which the ionic copolymers of the present invention are made have the general formula RCH=CH$_2$ where R is either a hydrogen or an alkyl group having preferably from one to eight carbon atoms. Thus, suitable olefins include ethylene, propylene, butene-1, pentene-1, hexene-1, heptene-1, 3-methylbutene-1, 4-methylpentene-1, etc. The preferred α-olefin is ethylene. Although polymers of olefins having higher carbon members can be employed in the present invention, they are not materials which are readily obtained or available. The concentration of the α-olefin is at least 50 mole percent in the copolymer, and is preferably greater than 80 mole percent.

The second component of the base copolymer comprises an α,β-ethylenically unsaturated carboxylic acid having from three to eight carbon atoms or monoesters or anhydrides of dicarboxylic acids having from four to eight carbon atoms. Representative examples of α,β-ethylenically unsaturated carboxylic acids are acrylic acid, methacrylic acid, ethacrylic acid, itaconic acid, maleic acid and fumaric acid. Representative examples of monoesters and anhydrides of said dicarboxylic acids are methyl hydrogen maleate, methyl hydrogen fumarate, ethyl hydrogen fumarate and maleic anhydride. The preferred α,β-ethylenically unsaturated carboxylic acids are acrylic acid and methacrylic acid. The concentration of acidic monomer units in the ionic copolymer of this invention is from 0.2 mole percent to 25 mole percent, and, preferably, from 1 to 10 mole percent. The base copolymers may be those in which the carboxylic acid groups are randomly distributed over all the copolymer molecules. Such distribution is obtained by direct polymerization of the olefin with the carboxylic acid in a constant environment reactor, using for example, the techniques disclosed in Canadian Patent No. 655,298.

The preferred ionic copolymers of this invention and their preparation are disclosed in U.S. Pat. Nos. 3,264,272 and 3,404,134 to Rees. Thus, a preferred ionic copolymer is one comprising 99–90 mole percent ethylene and 1–10 mole percent of methacrylic acid which is 10–90 percent neutralized with an ion of an alkali metal or an ion of a metal in Group II of the Periodic Table of Elements. The preferred ions are sodium and zinc.

The slip/block additives of this invention are saturated difunctional amides represented by the general formula

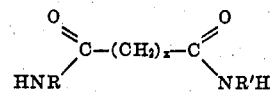

wherein x is from 2 to 12, R and R' are the same alkyl or alkenyl of four to 22 carbon atoms. Said additives of the above general formula incorporated in the ionomers of this invention resulted in films having good slip/block properties but in some cases chalking resulted. Specifically, slip/block additives of the above formula where R and R' are hexyl, octyl and oleyl, were evaluated in films of ionic copolymers and found to have good slip/block properties, with, however, excessive chalking. Chalking is defined as the powdery surface layer formed on a film which greatly reduces the optical quality of the film, i.e., increases the haze. The preferred slip/block additives of this invention are N,N'-di-erucyl adipamide and N,N'-di-erucyl sebacamide.

The migration of slip/block additives to a film surface is greatly retarded in ionomers relative to polyethylene because of the polar nature of the ionomer structure. Consequently, very high loadings of additives are necessary in ionomers to impart reasonable slip/block properties. Further, as the gloss of ionomer film is increased by higher temperature extrusion, resin design, or synthesis conditions, the film requires increasing amounts of additive to overcome the greater contact imparted by the smoother film surfaces. The slip additives of this invention when used in sufficient quantity reduce the blocking tendency and the coefficient of friction of films without chalking.

Generally, from 0.05 percent to 2.0 percent by weight of the slip/block additives of this invention based on the ionic copolymer yield films with improved slip and block properties and no chalking. The exact amount of the additive to be used will depend on the particular additive employed and the particular polymer with which it is used and the results desired therewith. Thus, optimum amounts can be determined by routine experimentation with particular additive/polymer compositions. Additionally, inorganic antiblock additives such as silica can also be present to further reduce film blocking as desired.

The compositions of this invention can have present therein other conventional compounding additives such as colorants, mold release agents, antioxidants, modifiers, plasticizers or fillers to effect desirable modifications in properties.

The slip and block additives of the present invention can be incorporated into film-forming resin compositions by conventional methods such as by Banbury mixers, roll mills, by injection of the additive into an extruder which is extruding the composition, by dry blending with the feed stock to the extruder, or by melt solution.

The resultant resin composition can be subjected to any of the conventional film-forming processes such as blowing, casting or extruding to form film which is useful for wrapping, etc. and which exhibits improved slip and blocking properties without chalking, generally without sacrifice of the visual characteristics of the film, as measured by gloss and haze tests.

The Examples that follow are illustrative of the present invention. Parts and percentages are by weight unless otherwise indicated. All film was blown on a 1 ½ inch diameter Modern Plastics Machine blown film extruder using a 4-inch diameter die. Film blow-up ratio was 1.6:1.

In these Examples, gloss is measured according to ASTM D-2457-70 using a Gardner Gloss Meter and a 20° gloss head. Haze, in percent, is measured according to ASTM D-1003-70-Procedure A. Slip in lb/lb is the kinetic coefficient of friction measured according to ASTM D-1894-63-Procedure B with minor deviations in sled diameter and weights. Block in lb/8 in$^2$ is force in shear required to separate a film sandwich of 8 square inches contact area between the two film layers. Natural block is a term given to the block imparted by the nip rolls of the blown film extruder. Pressed block, in lb/4 in$^2$ is the force in shear required to separate a film sandwich of 4 in$^2$ contact area between the two film layers. In determining pressed block, a force is imparted by use of a 10-lb. weight for 2 minutes at 74°F. and 50 percent relative humidity. Chalking tendency is a subjective visual determination of the tendency of a film to chalk wherein 0 is none, 1 is slight or light, 2 is moderate and 3 is heavy.

EXAMPLE 1

A 10 percent methacrylic acid copolymer with ethylene, synthesized in a continuous stirred autoclave at constant environment to 35 melt index, which has been 52 percent neutralized with sodium ions by melt blending in an extractor-extruder apparatus, reducing the melt index to 1.2, was blended with (1) N,N'-di-erucyl adipamide, (2) stearamide and (3) N-oleyl palmitamide in a 2 inch diameter extruder at 210°C. melt temperature before converting to 2.0 mil ionomer film by blowing at 200°-215°C. Table I summarizes the data on the 2 mil ionomer film prepared. The data show that all the additives at sufficiently high loading gave acceptable coefficient of friction (<0.3 lb/lb) but only the N,N'-di-erucyl adipamide gave acceptable block values at levels low enough to not result in eventual chalking.

EXAMPLE 2

The additives of Example 1 were melt blended with an 8.8 percent methacrylic acid copolymer of ethylene synthesized as in Example 1 to 10 melt index in which 15 percent of the acid is neutralized with zinc ion reducing the melt index to 4.4. Film was prepared according to the procedure of Example 1 at 200°-230°C. and the test data summarized in Table II. The data in Table II show that chalking was more severe in this less polar ionomer at equivalent additive loadings. However, at levels of 0.8 percent or less, the N,N'-di-erucyl adipamide gave excellent slip/block properties without chalking while the other additives chalked at all levels tested.

EXAMPLE 3

(1) N,N'-erucyl adipamide, (2) N-stearyl erucamide and (3) N-oleyl palmitamide were each separately melt blended with the ionomer of Example 1 and film prepared according to the procedure of Example 1 except that the film was blown at 215°-222°C. melt. Table III summarizes the data obtained from the film. Also included in Table III are data showing erucamide and stearamide which are common polyethylene slip/block additives in the same ionomer for comparison. All additives except the N,N'-di-erucyl adipamide resulted in long term chalking problems at levels which still did not result in acceptable antiblock protection although slip level was satisfactory.

EXAMPLE 4

(1) N,N'-di-erucyl adipamide, (2) N,N'-di-erucyl sebacamide (slip/block additives) were each separately melt blended according to the procedure of Example 1 with the ionomer of Example 1 to produce blown film as in Example 1 except that the film was 1.25 mil and blown at 235°C. These blends also contained 0.3 percent $SiO_2$ (additional antiblock additive) which was fed directly to the blown film extruder for melt incorporation of the additives. Table IV summarizes the data obtained on the film.

EXAMPLE 5

The ionomer of Example 1 was melt blended with the additives shown in Table V and film blown at 208°–235°C. to compare slip/block additives of this invention. The data obtained are shown in Table V.

TABLE I

| Chalking Tendency Slip Additive | Level % | Gloss 20° | Haze % | Coefficient of Friction (Slip) lb/lb | Block Natural lb/8 in² | Block Pressed lb/4 in² | Warehouse Storage Haze, % After 10 Mo. | Subjective Chalking - 8 Mo. |
|---|---|---|---|---|---|---|---|---|
| None | 0 | 72 | 1.7 | >1.0 | >5.0 | 2.5 | 2.3 | 0 |
| N,N'-di-erucyl adipamide | 0.5 | 75 | 1.6 | 0.14 | 3.1 | 0.31 | 1.6 | 0 |
| do. | 0.8 | 74 | 1.5 | 0.10 | 4.4 | 0.50 | 2.5 | 0 |
| do. | 1.4 | 87 | 1.2 | 0.13 | 2.3 | 0.99 | 1.6 | 0 |
| Stearamide | 0.5 | 78 | 1.4 | >1.0 | >5.0 | 3.6 | 8.2 | 1+ |
| do. | 0.8 | 80 | 1.4 | 0.31 | >5.0 | 2.6 | 7.5 | 2 |
| do. | 1.4 | 85 | 1.3 | 0.27 | >5.0 | 4.0 | 3.5 | 1+ |
| N-oleyl palmitamide | 0.3 | 75 | 1.6 | >1.0 | >5.0 | 2.5 | 2.5 | 1⁻ |
| do. | 0.5 | 78 | 1.7 | 0.1 | >5.0 | 2.1 | 3.4 | 1⁻ |
| do. | 0.8 | 71 | 4.4 | 0.06 | 4.6 | 0.45 | 16.7 | 3 |

Chalking Code: 0 = None; 1 = Slight; 2 = Moderate; 3 = Heavy

TABLE II

| Chalking Tendency Slip Additive | Level % | Gloss 20° | Haze % | Coefficient of Friction (Slip) lb/lb | Block Natural lb/8 in² | Block Pressed lb/4 in² | Warehouse Storage Haze, % After 10 Mo. | Subjective Chalking - 8 Mo. |
|---|---|---|---|---|---|---|---|---|
| None | 0 | 69 | 1.6 | >1.0 | >5.0 | 3.9 | 2.5 | 0 |
| N,N'-di-erucyl adipamide | 0.5 | 71 | 1.4 | 0.22 | 2.7 | 0.78 | 2.5 | 0+ |
| do. | 0.8 | 67 | 1.5 | 0.21 | 3.6 | 0.76 | 2.8 | 0 |
| do. | 1.4 | 87 | 1.3 | 0.34 | 2.1 | 0.0 | 9.0 | 3 |
| Stearamide | 0.5 | 57 | 4.1 | >1.0 | >5.0 | 4.3 | 15.0 | 3 |
| do. | 0.8 | 64 | 2.4 | >1.0 | >5.0 | 2.8 | 9.1 | 3 |
| do. | 1.4 | 65 | 1.5 | 0.51 | >5.0 | 2.0 | 6.5 | 2 |
| N-oleyl palmitamide | 0.3 | 63 | 1.9 | >1.0 | >5.0 | 3.9 | 12.7 | 3 |
| do. | 0.5 | 55 | 4.2 | >1.0 | >5.0 | 4.0 | 19.4 | 3 |
| do. | 0.8 | 60 | 2.0 | >1.0 | >5.0 | 2.7 | 10.3 | 2+ |

Chalking Code: 0 = None; 1 = Slight; 2 = Moderate; 3 = Heavy

TABLE III

| Slip Additive | Level % | Film Haze % | Coefficient of Friction (Slip) lb/lb | Block Natural lb/8 in.² | Warehouse Storage Subjective Chalking Tendency² 8 Mo. Storage |
|---|---|---|---|---|---|
| N,N'-di-erucyl adipamide | 1.0 | 1.9 | 0.19 | 1.9 | 0 |
| N-oleyl palmitamide | 0.5 | 2.7 | 0.12 | 4.0 | 2 |
| do. | 1.0 | 3.7 | 0.14 | 3.5 | 2 |
| N-stearyl erucamide | 0.5 | 3.0 | 0.17 | >5.0 | 2 |
| do. | 1.0 | 14.7¹ | 0.12 | 1.9 | 3 |
| Erucamide | 2.0 | 1.9 | 0.08 | >5.0 | 3 |
| Stearamide | 2.0 | 1.8 | 0.31 | >5.0 | 1 |

²Chalking Code: 0 = None; 1 = Slight; 2 = Moderate; 3 = Heavy
¹Severe chalking by the time haze was measured, 3 days after blowing film

TABLE IV

| Additives and Level | Chalking after 4 years Warehouse Storage | Film Gloss 20° | Haze % | Coefficient of Friction (Slip) lb/lb | Block, lb. Natural lb/8 in² | Block, lb. Pressed lb/8 in²* |
|---|---|---|---|---|---|---|
| 1% N,N'-di-erucyl sebacamide + 0.3% $SiO_2$ | 0 | 57 | 3.8 | 0.26 | 1.06 | 0.24 |
| 1% N,N'-di-erucyl adipamide + 0.3% $SiO_2$ | 0 | 62 | 4.0 | 0.14 | 1.07 | 0.86 |

* Block in shear imparted by 21.5 lb. weight to 8 in.² sandwich for two minutes.

TABLE V

| Caliper mils | Melt °C. | Additive (1% level) | Gloss 20° | Haze % | Slip lb/lb | Natural Block lb/8 in$^2$ | Chalking Rating |
|---|---|---|---|---|---|---|---|
| 1.5 | 217 | N,N'-di(n-hexyl)adipamide | 53 | 3 | 0.13 | 0.77 | 3 |
| 2.0 | 208 | N,N'-di(n-octyl)adipamide | 47 | 3.9 | 0.21 | 1.24 | 3 |
| 2.0 | 215 | N,N'-di(oleyl)adipamide | 46 | 2.3 | 0.18 | 1.35 | 2 |
| 1.25 | 235 | N,N'-di(n-octyl)adipamide | 60 | 3.5 | 0.19 | 1.09 | 2 |
| 1.25 | 235 | N,N'-di(erucyl)adipamide | 62 | 4.0 | 0.14 | 1.07 | 0 |

Ionomer films containing N,N'-di-erucyl adipamide or N,N'-di-erucyl sebacamide (slip/block additives) have uses as film, laminations and coatings in the flexible packaging industry where reduced sliding friction or blocking of the film to itself or other materials is desirable.

The foregoing detailed description has been given for clarity of understanding only and no unnecessary limitations are to be understood therefrom. The invention is not limited to exact details shown and described for obvious modifications will occur to one skilled in the art.

What is claimed is:

1. The composition comprising
   a. an ionic copolymer of an α-olefin having the formula R—CH=CH$_2$, where R is a radical selected from the group consisting of hydrogen and alkyl radicals having from one to eight carbon atoms and α,β-ethylenically unsaturated carboxylic acids having three to eight carbon atoms, wherein the concentration of the α-olefin is at least 75 mole percent in the copolymer, based on the α-olefin acid copolymer, the copolymers having from 10 percent to 90 percent of the carboxylic acid groups ionized by neutralization with metal ions, the carboxylic acid content of the copolymer prior to neutralization is from 0.2 to 25 mole percent, based on the copolymer, and said metal ions having an ionized valence of from 1 to 2, inclusive, when the unsaturated acid is a monocarboxylic acid and an ionized valence of one when the unsaturated acid is a dicarboxylic acid and said metal ions are selected from the group consisting of alkali metal ions and ions of metals of Group II of the Periodic Table of the Elements, and
   b. 0.05 to 2.0 weight percent of N,N'-di-erucyl adipamide or N,N'-di-erucyl sebacamide.

2. The composition of claim 1 wherein the copolymer is a direct copolymer of ethylene and the unsaturated carboxylic acid in which the carboxylic acid groups are randomly distributed over all the molecules of the polymeric composition.

3. The composition of claim 1 wherein the metal ions are sodium ions.

4. The composition of claim 1 wherein the metal ions are potassium ions.

5. The composition of claim 2 in the form of a film.

6. The composition comprising
   a. an ionic copolymer of ethylene and from 0.2 to 10 mole percent of an α,β-ethylenically unsaturated carboxylic acid selected from the group consisting of acrylic acid and methacrylic acid in which from 10 to 90 percent of the carboxylic acid groups originally present have been neutralized with a metal ion selected from the group consisting of alkali metal ions, and ions of a metal of Group II of the Periodic Table of the Elements, and
   b. 0.05 to 2.0 weight percent of N,N'-di-erucyl adipamide or of N,N'-di-erucyl sebacamide.

7. The composition of claim 6 wherein the ethylenecarboxylic acid copolymer is a direct copolymer of ethylene and the α,β-ethylenically unsaturated carboxylic acid, in which the carboxylic acid groups are randomly distributed over all the molecules of the polymeric composition.

8. The composition of claim 7 wherein the metal ions are sodium ions.

9. The composition of claim 7 wherein the metal ions are zinc ions.

10. The composition of claim 7 in the form of a film.

* * * * *